April 12, 1927.

H. A. W. WOOD ET AL 1,623,992

BRAKE FOR WEB ROLL TENSION DEVICES

Original Filed Dec. 18, 1914    3 Sheets-Sheet 1

Inventors
H. A. W. Wood.
C. Nordfors.

April 12, 1927.
H. A. W. WOOD ET AL
1,623,992
BRAKE FOR WEB ROLL TENSION DEVICES
Original Filed Dec. 18, 1914   3 Sheets-Sheet 2
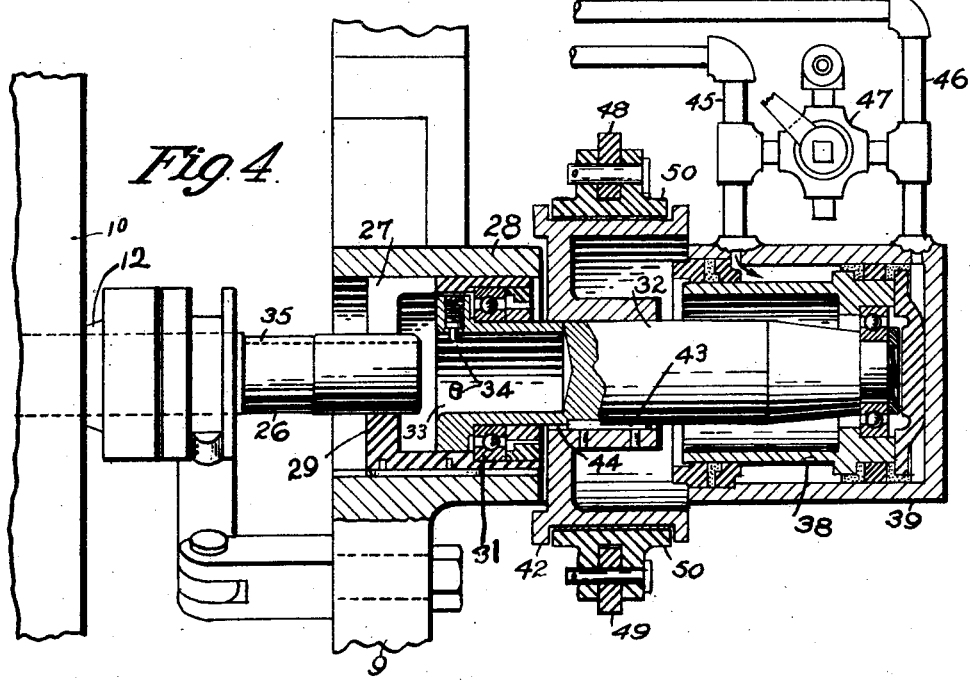
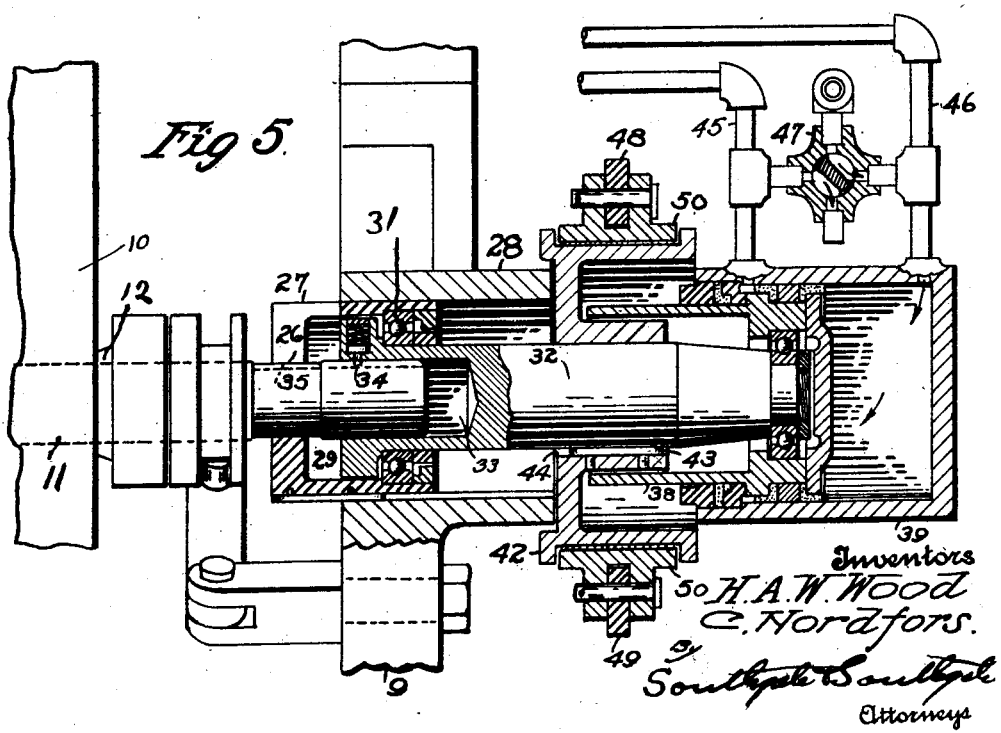

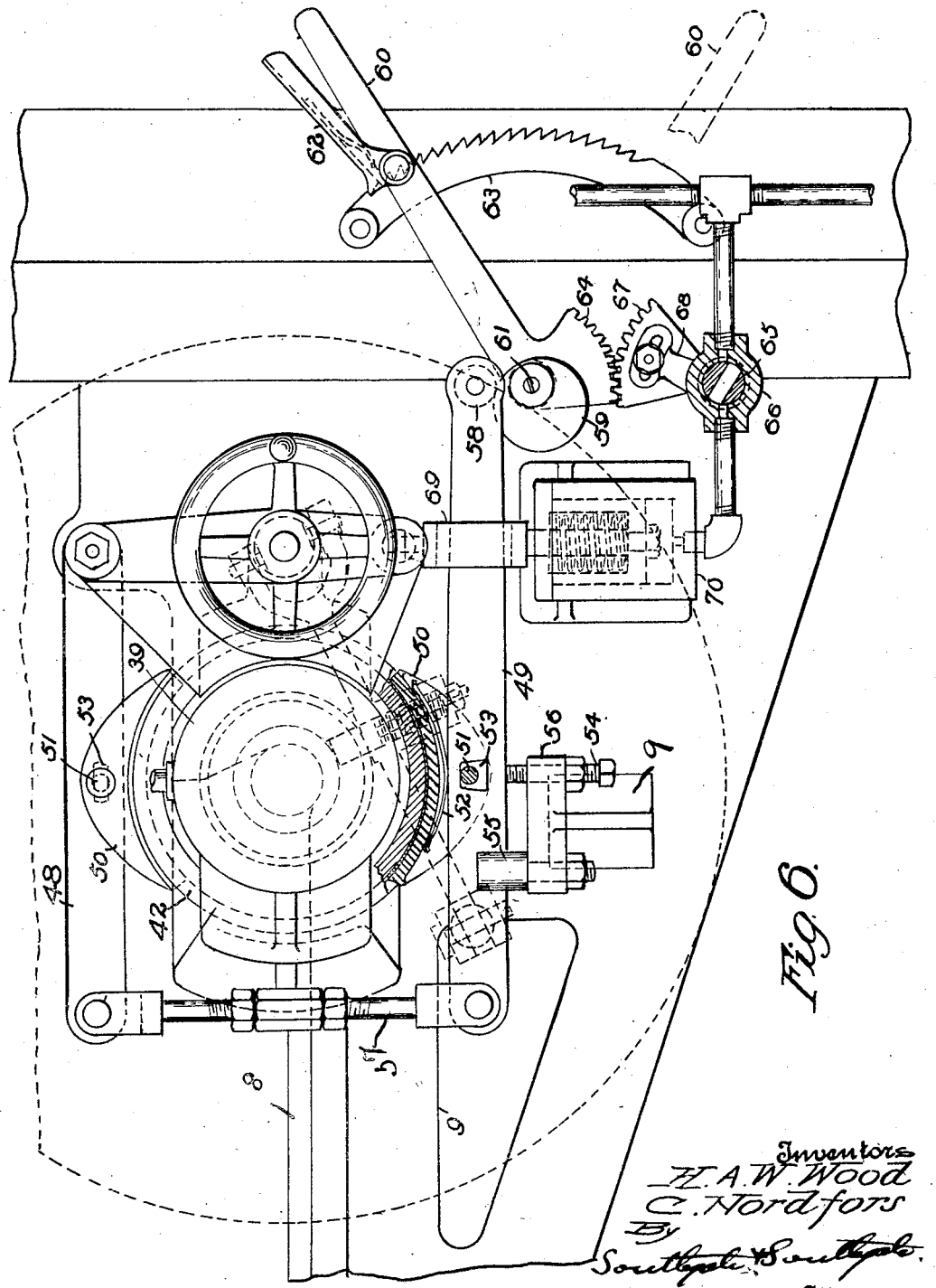

Patented Apr. 12, 1927.

1,623,992

UNITED STATES PATENT OFFICE.

HENRY A. WISE WOOD, OF NEW YORK, N. Y., AND CONRAD NORDFORS, OF JERSEY CITY HEIGHTS, NEW JERSEY, ASSIGNORS TO WOOD NEWSPAPER MACHINERY CORPORATION, OF NEW YORK, N. Y., A CORPORATION OF VIRGINIA.

BRAKE FOR WEB-ROLL TENSION DEVICES.

Original application filed December 18, 1914, Serial No. 877,873. Divided and this application filed January 21, 1921, Serial No. 438,828. Renewed December 27, 1926.

This is a division of our Patent No. 1,378,305, granted May 17, 1921, on an application filed Dec. 18, 1914, Serial No. 877,873, which related to the control of the web roll for a web printing press. The principal objects of this invention are to provide a new and improved tension controlling brake apparatus; to provide a practicable means whereby the brake and pulley can be mounted separately from the spindle, so that the breakage of the brake pulleys which frequently occurs in press rooms will be practically eliminated; to provide an improved braking mechanism by which the operator can impose a very gradual pressure on the brake pulley for a slight increase in tension or a yielding grip for an emergency stop and by which, on an emergency stop, the brake shoes will be allowed to turn slightly with the brake pulley to prevent the bringing of the roll to an abrupt stop and the breakage of the web; and to so arrange the regulating valve, which controls the emergency portion of the brake, in connection with the lever by which the brake is operated manually, that when the lever is in a position to allow a nearly exhausted roll to run freely without tension the emergency brake mechanism will be slow acting and when the full roll is run at a maximum tension it will be quick acting.

The invention also involves improvements in various features of construction and combinations of parts as will appear hereinafter.

Reference is to be had to the accompanying drawings in which—

Fig. 4 is a central sectional view on the axis of the web roll spindle showing the mechanism for connecting it with the brake pulley;

Fig. 5 is a similar view showing the parts in another position, and

Fig. 6 is a side elevation of the brake mechanism with parts in section.

Figure 1:
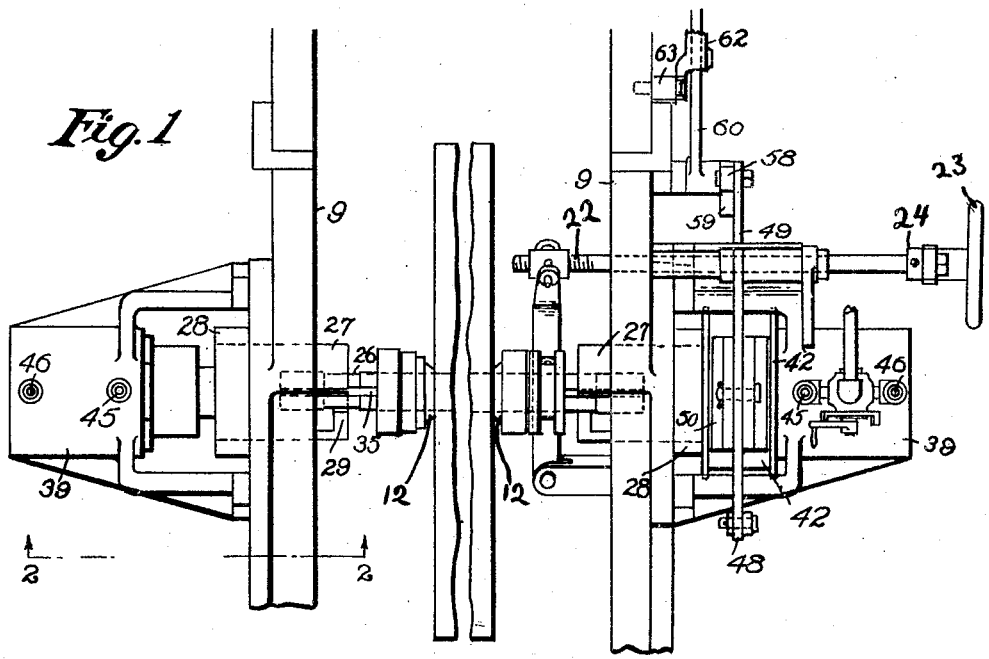
Fig. 1 is a plan of a portion of the frame of a web printing press showing the web roll in position thereon and broken away at the center.
Figure 2:
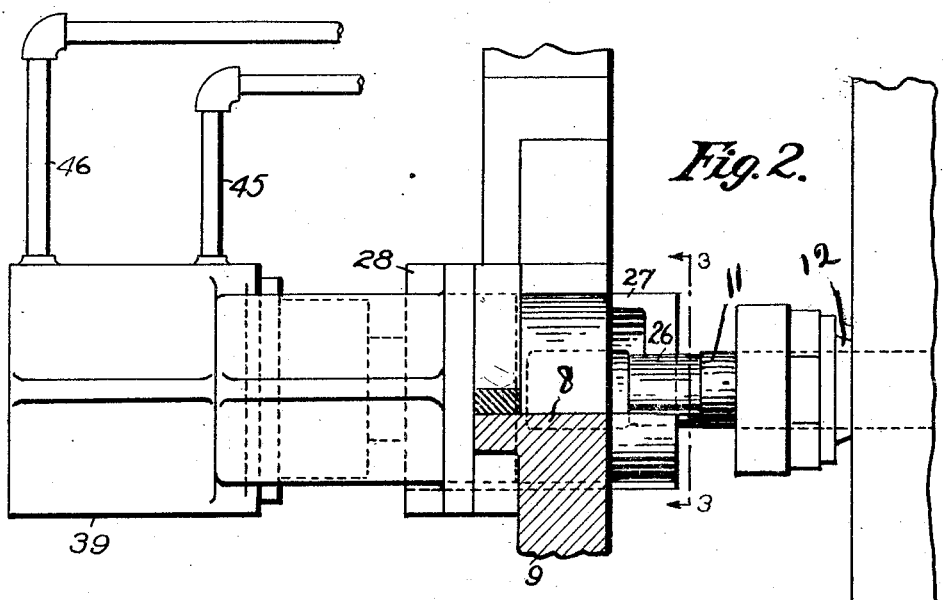
Fig. 2 is a view of one end of the device showing the track for supporting the end of the web roll spindle in section.
Figure 3:
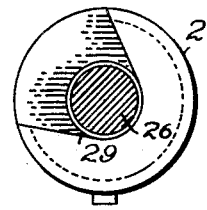
Fig. 3 is a sectional view on the line 3—3 of Fig. 2.

Although capable of general use, the invention is shown as applied to the frame 9 of a web printing press. This frame is shown as provided as usual with a runway consisting of two rails 8 for supporting the ends of a spindle 11 of the paper roll. The roll is mounted on the spindle by means of the usual cones 12. An operating screw 22 passes through the side frame 9 and is operated by means of a hand wheel 23 and collar 24 as usual.

It will be noted that this spindle 11 is shorter than usual and is not provided with any brake pulley but near each end is provided with a slightly reduced neck 26. It is the end of the spindle beyond this neck that is carried by the runway.

The frame of the press at the end of the runway is provided with a hollow cylindrical projection 28 on each side in which slides a cylindrical housing 27 provided with a depressed surface 29 normally registering with the runway 8 and virtually constituting a continuation thereof. The spindle is rolled in and passes from the runway on this surface and brings up against the end of it. This centers it at the exact center of the cylindrical projection 28.

The housing 27 carries at its rear end a ball bearing ring 31. The usual ball bearing supports the end of the sleeve coupling 32. The front end of the sleeve coupling is provided with a recess 33 for receiving the end of the spindle and is provided with spring-seated pins 34 for engaging in a keyway 35 in the spindle 11.

A brake pulley 42 is slidably mounted on the coupling 32 by means of a key 43 fixed to the pulley and having sliding engagement in a groove 44 on the coupling 32. The two cylinders 39 on opposite sides of the frame are connected by air pipes 45 and 46. These pipes are connected with each other at any convenient point by a transverse pipe in which is an operating valve 47 connected with the inlet and exhaust. It will be seen therefore that when air is admitted behind one of the pistons 38, it being assumed that the spindle is centered as has been mentioned, the pistons together with the couplings 32 and the bearings, as well as the housings 27, will be forced toward the center of the machine. The recess in the end of the coupling 32 thus receives the end of the web roll spindle.

At first the pins 34 yield and allow the parts to come into proper relation with each other but as soon as the web roll has turned a small part of a revolution one of the pins 34 will spring into the keyway 35. Thereafter the rotation of the web roll will be transmitted positively to the coupling 32. By comparsion of Figs. 4 and 5 it will be seen that although the web roll spindle rested on the surface 29 when first brought into position, it is supported by the coupling and the cylindrical projection 28 when the parts are moved over as shown in Fig. 5. The reduced portion 26 of the web roll spindle then comes over the surface 29 and the spindle is entirely supported by the anti-friction ball bearings. Thus no friction takes place between the spindle and the supporting surfaces 29. Furthermore, it will be seen that the coupling 32 can be moved in this way without disturbing the brake pulley 42 and without preventing the positive rotation thereof with the coupling and web roll spindle. The pulley is kept in proper position, while the coupling moves, by its brake shoes 50 engaging the flanges on the pulley. It will be understood that although there is a coupling on each side of the press, only one of them, preferably, has a brake pulley.

The brake shoes 50 are mounted on two brake beams 48 and 49 by means of pins 51. These pins extend into elongated slots 53 in the brake shoes for a purpose that will appear. The lower brake shoe is shown as provided with a flat spring 52 bearing on its outer surface and also bearing on the brake beam 49. The two brake beams are connected by an adjustable link 57.

The lower brake beam 49 is supported in its lowest position by a set screw 54 and is held from transverse motion by a fork piece 55 both mounted in a bracket 56 on the frame 9. The extreme free end of the longer brake beam 49 carries a roller 58 which engages an eccentric 59 constituting a part of an operating lever 60 which is pivoted on a stud 61. This lever is provided with a pivoted pawl lever 62 engaging a ratchet segment 63 fastened to the frame of the machine. The lever is also provided with a gear segment 64 meshing with a second gear segment 67 which is pivoted on the axis of the stem 65 of an inlet valve 66.

This valve stem 65 is provided with a slotted lever 68 fixed thereto and adapted to be adjustably connected through the slot with the segment 67 so that the valve will turn with this segment. This valve 66 controls the passage of compressed air or other fluid to an emergency brake cylinder 70, the piston 69 of which straddles the lower brake beam 49 and is controlled by this valve. The admission of air to the pipe in which the valve 66 is located is controlled through the usual push button system in connection with the braking arrangement of the entire press (not shown).

The action of the braking mechanism will be understood readily. The regulating valve 66 and connected parts are so set that when the operating lever 60 is in the position shown in full lines in Fig. 6 the valve opening is reduced to a minimum. The parts are in this condition when a paper roll is nearly exhausted and the brake pulley runs freely. In this condition of low tension it will be seen that the emergency brake cylinder will act slowly when the push button is operated. This is for the purpose of preventing too rapid an action at this time and causing the web to break. When the lever is in the dotted line position in Fig. 6, which is the position it occupies when the full roll is operating under maximum running tension, the valve is fully open and the emergency brake cylinder is able to act with extreme rapidity upon the operation of the push button.

The spring 52 arranged as described enables the operator to impose a very gradual pressure on the brake pulley for a slight increase of tension and a yielding grip for an emergency stop. On account of this the preliminary pressure on the pulley surface is equal only to the tension of the spring.

The object of having the pins 51 pass through elongated slots 53 is to permit the brake shoes to turn slightly with the pulley when the emergency air cylinder is operated to bring the roll to an abrupt stop. The spring 52 affords a yielding grip also so that the gripping action is neither rigid nor instantaneous. Under these conditions the tendency of the web to break is largely overcome. This is particularly important when the web roll is stopped when nearly exhausted. This of course cooperates with the regulating valve and its connections as described.

It will be seen that the web roll is readily connected with and disconnected from the brake pulley and that in this way it is an easy and simple matter to run the spindle on ball bearings, thus reducing friction as well as breaks in the paper.

Although we have illustrated and described only one form of the invention, we are aware of the fact that it is capable of being carried out in many other ways without departing from the scope thereof as expressed in the claims. Therefore we do not wish to be limited to the details of construction shown and described herein, but what we do claim is:—

1. In a printing press, the combination with a spindle for a paper roll and a brake pulley rotatable independently thereof, of means rotatable with the brake pulley for connecting it with the spindle and transmitting the motion of rotation of the spindle to the pulley, a pair of brake shoes engaging the surface of said pulley, one of said brake shoes being provided with a spring, and a brake beam engaging said spring to press it inwardly toward the brake shoe whereby a yielding pressure can be applied to the brake pulley through said brake shoe.

2. The combination with a spindle and a separate brake pulley, of means for connecting the brake pulley and spindle, a pair of brake shoes engaging the brake pulley, brake beams for said shoes having elongated slots therein, and pins on the brake shoes entering said slots, whereby upon the sudden application of said brake shoes to the pulley with a strong force the brake shoes will be allowed to rotate slightly with the pulley before coming to a dead stop.

3. The combination with a spindle and a brake pulley, of means for connecting the brake pulley and spindle, a pair of brake shoes engaging the brake pulley, brake means for said shoes, means for yieldingly connecting one of the brake shoes with its beam and means whereby upon the sudden application of said brake shoes to the pulley with a strong force the brake shoes will be allowed to rotate slightly with the pulley before coming to a dead stop.

4. The combination with a spindle and a separate brake pulley, of means for connecting the brake pulley and spindle, a pair of brake shoes engaging the brake pulley, brake beams for said shoes having elongated slots therein, pins on the brake shoes entering said slots, a cylinder, a piston in the cylinder connected with one of said brake beams for operating it, means for supplying fluid to said cylinder, and a regulating valve in the supplying means.

5. The combination of a brake pulley, brake shoes, and brake beams therefor, of a cylinder, a piston in the cylinder connected with the brake beams for operating them, means for supplying fluid to said cylinder comprising a valve, a lever, means connected with said lever for operating the brake beams to apply the brakes when the lever is turned in one direction, and means connected with said lever for operating said valve.

6. The combination with a brake pulley, a brake shoe, and a brake beam therefor, of a cylinder, a piston in the cylinder connected with the brake beam for operating it, means for supplying fluid to said cylinder comprising a valve, a lever, means connected with said lever for operating the brake beam to apply the brake when the lever is turned in one direction, and means connected with said lever for operating said valve to reduce the valve opening to a minimum when the lever is in a position to hold the brake back from the brake pulley, whereby when the tension is removed from the brake the piston for applying the brake will have a relatively slow action.

7. The combination with a brake pulley, brake shoes, and brake beams therefor, of a cylinder, a piston in the cylinder connected with the brake beams for operating them, means for supplying fluid to said cylinder comprising a valve, a lever, means connected with said lever for operating the brake beams to apply the brakes when the lever is turned in one direction, and means connected with said lever for operating said valve to reduce the valve opening to a minimum when the lever is in a position to hold the brakes back from the brake pulley, whereby when the tension is removed from the brakes the fluid operated means for applying the brakes will have a relatively slow action, said means also acting to fully open the valve when the lever is in position to apply the brakes so that the piston and cylinder will be ready for quick action.

8. The combination with a brake pulley, brake shoes, and brake beams therefor, of a cylinder, a piston in the cylinder connected with the brake beams for operating them, means for suplying fluid to said cylinder comprising a valve, a lever, means connected with said lever for operating the brake beams to apply the brakes when the lever is turned in one direction, and means connected with said lever for operating said valve to fully open the valve when the lever is in position to apply the brakes so that the piston and cylinder will be ready for quick action.

9. The combination with a web roll brake, pulley, brake shoes, and brake beams therefor, of a lever, means connected with said lever for operating the brake beams to apply the brakes when the lever is turned in one direction, an emergency brake applying device, and means connected with said lever for allowing said emergency device to operate rapidly when operating normally under tension, and for preventing the rapid operation of the emergency device when operating under low tension.

10. The combination of a brake pulley, a brake shoe, and a brake beam therefor, of a cylinder, a piston in the cylinder connected with the brake beam for operating it, means for supplying fluid to said cylinder comprising a valve, means for operating the brake beam to apply the brake, and means for operating said valve to reduce the valve opening to a minimum when the piston is in a position to hold the brake back from the brake pulley, whereby when the tension is removed from the brake the piston for applying the brake will have a relatively slow action.

11. The combination of a brake pulley, brake shoes, and brake beams therefor, of a cylinder, a piston connected with the brake beams for operating them, means for supplying fluid to said cylinder comprising a valve, and means for operating said valve to reduce the valve opening to a minimum when the piston is in a position to hold the brakes back from the brake pulley, whereby when the tension is removed from the brakes, the piston for applying the brakes will have a relatively slow action, said valve operating means being constructed and adapted to fully open the valve when the piston is in position to apply the brakes so that the piston and cylinder will be ready for quick action.

12. The combination of a brake pulley, brake shoes, and brake beams therefor, of a cylinder, a piston connected with the brake beams for operating them, means for supplying fluid to said cylinder comprising a valve, and means for operating said valve to fully open the valve when the piston is in position to apply the brakes so that the piston and cylinder will be ready for quick action.

In testimony whereof we have hereunto affixed our signatures.

HENRY A. WISE WOOD.
CONRAD NORDFORS.